United States Patent
Ono et al.

(10) Patent No.: US 11,280,999 B2
(45) Date of Patent: Mar. 22, 2022

(54) HEAD-UP DISPLAY

(71) Applicant: Maxell, Ltd., Kyoto (JP)

(72) Inventors: Chohei Ono, Kyoto (JP); Akio Misawa, Kyoto (JP)

(73) Assignee: MAXELL, LTD., Kyoto (JP)

(*) Notice: Subject to any disclaimer, the term of this patent is extended or adjusted under 35 U.S.C. 154(b) by 0 days.

(21) Appl. No.: 17/261,182

(22) PCT Filed: May 16, 2019

(86) PCT No.: PCT/JP2019/019533
§ 371 (c)(1),
(2) Date: Jan. 19, 2021

(87) PCT Pub. No.: WO2020/021823
PCT Pub. Date: Jan. 30, 2020

(65) Prior Publication Data
US 2021/0271076 A1    Sep. 2, 2021

(30) Foreign Application Priority Data
Jul. 23, 2018  (JP) .............................. JP2018-137944

(51) Int. Cl.
*G09G 5/00*       (2006.01)
*G02B 27/00*      (2006.01)
(Continued)

(52) U.S. Cl.
CPC .......... *G02B 27/0093* (2013.01); *B60K 35/00* (2013.01); *G02B 5/10* (2013.01);
(Continued)

(58) Field of Classification Search
CPC .......................................... B60K 2370/1529
See application file for complete search history.

(56) References Cited

U.S. PATENT DOCUMENTS

2003/0169213 A1*  9/2003  Spero ................ G02B 27/0093
                                                    345/7
2013/0265646 A1* 10/2013  Sakai ...................... G02B 27/01
                                                  359/631
(Continued)

FOREIGN PATENT DOCUMENTS

JP      2008-155720 A     7/2008
JP      2011-133508 A     7/2011
(Continued)

OTHER PUBLICATIONS

International Search Report and Written Opinion dated Aug. 6, 2019, received for PCT Application PCT/JP2019/019533, Filed on May 16, 2019, 10 pages including English Translation.

*Primary Examiner* — Nan-Ying Yang
(74) *Attorney, Agent, or Firm* — Xsensus LLP

(57) ABSTRACT

A head-up display comprises an image display device, a virtual image optical system, a housing with a housing opening, an antiglare plate covering the housing opening, a camera for capturing an image of a face area including an eye of a driver, a viewpoint detection device for detecting a viewpoint of the driver based on the image captured by the camera, and a main controller. The camera is installed on a position outside the housing and withdrawn from an optical path of the image light emitted through the housing opening, as well as in an orientation for capturing an image of an area where a face including the eye of the driver is reflected on the antiglare plate. The main controller controls to adjust an emission direction of the image light based on a viewpoint position of the driver detected by the viewpoint detection device.

8 Claims, 16 Drawing Sheets

(51) Int. Cl.
 B60K 35/00 (2006.01)
 G02B 5/10 (2006.01)
 G02B 7/182 (2021.01)
 G02B 27/01 (2006.01)
 G06F 3/01 (2006.01)
 H04N 5/33 (2006.01)

(52) U.S. Cl.
 CPC ......... G02B 7/182 (2013.01); G02B 27/0101 (2013.01); G06F 3/013 (2013.01); H04N 5/332 (2013.01); *B60K 2370/149* (2019.05); *B60K 2370/1529* (2019.05); *B60K 2370/21* (2019.05); *B60K 2370/23* (2019.05); *G02B 2027/014* (2013.01); *G02B 2027/0138* (2013.01)

(56) References Cited

U.S. PATENT DOCUMENTS

| 2017/0115485 | A1 | 4/2017 | Saito et al. |
| 2017/0309257 | A1 | 10/2017 | Akita et al. |
| 2020/0159013 | A1 | 5/2020 | Hirata et al. |

FOREIGN PATENT DOCUMENTS

| JP | 2015-152746 | A | 8/2015 |
| JP | 2016-14861 | A | 1/2016 |
| JP | 2018-97252 | A | 6/2018 |
| WO | 2016/067574 | A1 | 5/2016 |
| WO | 2018/029999 | A1 | 2/2018 |

\* cited by examiner

HEAD-UP DISPLAY

CROSS-REFERENCE TO RELATED APPLICATIONS

The present application is based on PCT filing PCT/JP2019/019533, filed May 16, 2019, which claims priority to JP 2018-137944, filed Jul. 23, 2018, the entire contents of each are incorporated herein by reference.

TECHNICAL FIELD

The present invention relates to a head-up display.

BACKGROUND ART

For example, in a vehicle such as an automobile, information such as vehicle speed and engine rotational speed is displayed on an instrument panel in a dashboard in general. In addition, a screen of a car navigation or the like is incorporated in the dashboard or displayed on a display mounted on the dashboard. Since the driver needs to largely move his or her line of sight when visually recognizing such information, a head-up display (Head Up Display, may be referred to as "HUD" in the following) for projecting and displaying information such as vehicle speed and instructions relating to the car navigation on a wind shield, a combiner, etc. has been known as a technique for reducing a movement amount of the line of sight.

As a technique relating to an HUD, Patent Literature 1 discloses a "head-up display" device comprising: an eyeball position detection means for detecting an eyeball position of the user; a control means for calculating an imaging position of a display image based on a first eyeball position detected by the eyeball position detection means; an optical path adjustment means for adjusting an emission direction of a visible light based on a calculation result of the control means; and a storage means for storing the first eyeball position as a reference eyeball position, wherein, when it is determined that there is a difference, which is equal to or more than a predetermined distance or a predetermined angle, between the reference eyeball position and a second eyeball position detected by the eye ball position detection means after a time of detecting the first eyeball position, the control means calculates the imaging position of the display image based on the second eyeball position and drives the optical path adjustment means based on a result of the calculation (extracted from Abstract).

CITATION LIST

Patent Literature

Patent Literature 1: JP-A-2008-155720

SUMMARY OF INVENTION

Technical Problem

A viewpoint detection camera is installed on the dashboard or in the vicinity of a ceiling near the wind shield. However, in the case of being placed on the dashboard, the viewpoint detection camera captures an image at a position on which it looks up the driver, while in the case of being placed near the ceiling, the viewpoint detection camera captures an image at a position on which it looks down the driver. A face image used for viewpoint detection is desirably a front image of the driver's face, however, it is unpreferable to place the viewpoint detection camera in front of the driver since it blocks the front view of the driver.

In this regard, Patent Literature 1 does not consider bringing the face image captured by the viewpoint detection camera closer to the front image, and thus there is room for further innovation in improving accuracy of viewpoint detection.

The present invention has been made in view of the circumstances described above, and an object of the present invention is to provide an HUD capable of controlling a virtual image display position while improving accuracy of viewpoint detection.

Solution to Problem

In order to solve the problems above, the present invention includes the technical features described in the scope of claims. As one aspect of the present invention, it is provided a head-up display for displaying a virtual image in front of a vehicle, the head-up display comprising: an image display device including a light source and a display element, which is configured to display a display object on the display element and emit an image light including the display object; a virtual image optical system configured to change an emission direction of the image light and enlarge and project the image light toward to a projection target member; a housing that accommodates the image display device and the virtual image optical system; a housing opening provided in the housing, through which the image light is emitted from the housing; an antiglare plate that covers the housing opening and transmits the image light; a camera configured to capture an image of a face area including an eye of a driver of the vehicle; a viewpoint detection device configured to detect a viewpoint of the driver based on the image captured by the camera; and a main controller connected to each of the image display device, the virtual image optical system, and the viewpoint detection device, wherein the camera is installed on a position which is outside the housing and withdrawn from an optical path of the image light emitted through the housing opening, as well as in an orientation for capturing an image of an area where a face including the eye of the driver is reflected on the antiglare plate, and the main controller is configured to perform control to adjust an emission direction of the image light based on a viewpoint position of the driver which has been detected by the viewpoint detection device.

Advantageous Effects of Invention

According to the present invention, it is possible to provide an HUD capable of controlling a virtual image display position while improving accuracy of viewpoint detection. The problems, configurations, and effects other than those described above will be clarified by explanation of the embodiments below.

DESCRIPTION OF EMBODIMENTS

Hereinafter, embodiments of the present invention will be described in detail with reference to the drawings. Throughout the drawings for explaining the embodiments, the same members are provided with the same reference signs in general, and repetitive explanation thereof will be omitted. In each of the embodiments described below, an example in which a head-up display (HUD) is installed in an automobile as a vehicle will be described, meanwhile, the present invention is also applicable to other kinds of vehicles such as a train.

Figure 1:
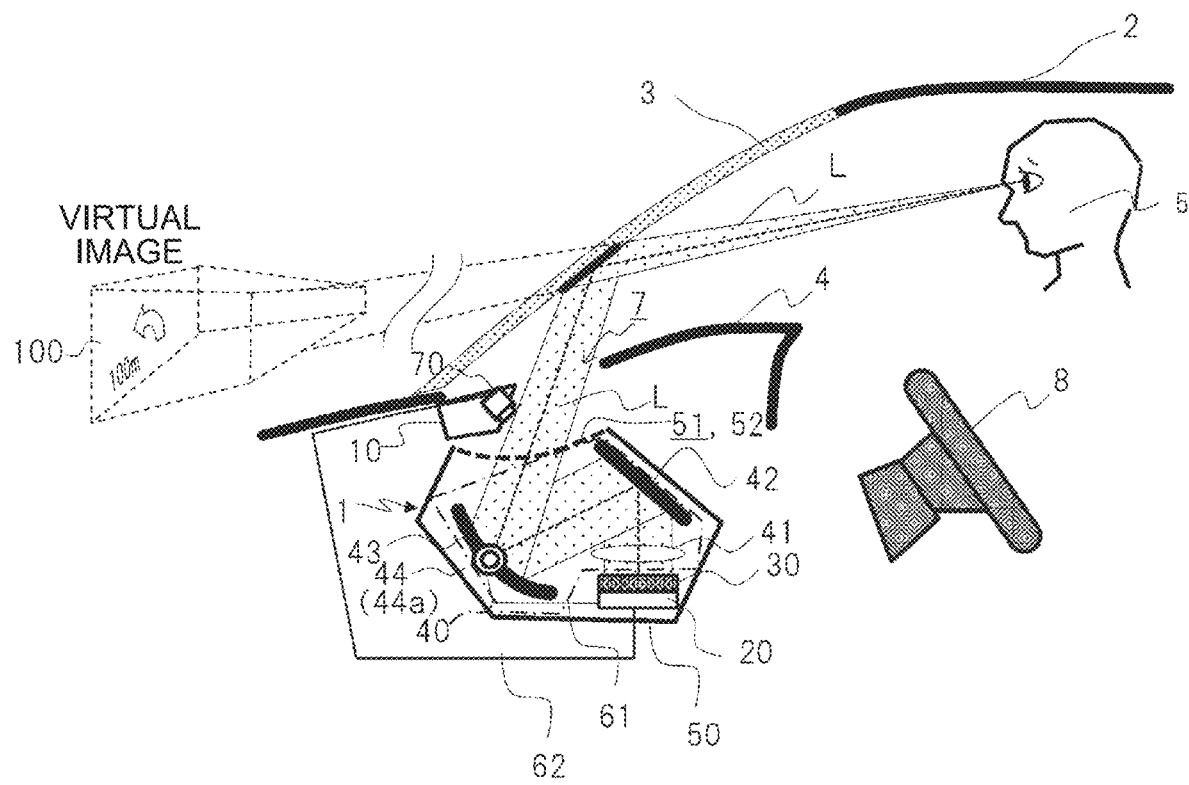
FIG. 1 is a schematic configuration diagram of an HUD.

With reference to FIG. 1, a configuration of an HUD 1 according to the present embodiment will be described. FIG. 1 is a schematic configuration diagram of the HUD 1. In the HUD 1 illustrated in FIG. 1, as a light shielding member for opening and closing an optical path of an image light L, a concave mirror 43 included in a virtual image optical system and a mirror drive unit 44 for rotating the concave mirror 43 are used.

As illustrated in FIG. 1, the HUD 1 is provided in a dashboard 4 of a vehicle 2. The dashboard 4 includes a dashboard opening 7 which allows the image light L emitted from the HUD 1 to pass therethrough. The image light L emitted from the HUD 1 passes through the dashboard opening 7, reaches a wind shield 3 which is a projection target member, is reflected by the wind shield 3, and enters the eye of a driver 5. The driver 5 visually recognizes a virtual image 100 by the image light L further forward than the wind shield 3. The projection target member is not limited to the wind shield 3, meanwhile, other members such as a combiner may be used as long as it is a member onto which the image light L is projected.

The HUD 1 includes a housing 50, an HUD controller 20 (corresponding to a main controller) and an image display device 30 which are accommodated in or mounted on the housing 50, a virtual image optical system 40 configured to enlarge and project the image light L emitted from the image display device 30.

On an upper surface of the housing 50, a housing opening 51 serving as an exit port of the image light L is formed. The housing opening 51 is covered with an antiglare plate (glare trap) 52 for preventing dust and the like from entering the housing 50. The antiglare plate 52 is formed by a member that transmits a visible light.

The image display device 30 is configured by using an LCD (Liquid Crystal Display), and operated in accordance with a control signal from the HUD controller 20. More specifically, the image display device 30 includes a light source 31, an illumination optical system 32, and a display element 33 that displays a display object and has transparency. A light irradiated from the light source 31 passes through the display element 33, so that the image light L including the display object is emitted from the image display device 30 (see FIG. 4).

The virtual image optical system 40 is configured by a lens unit 41, a folding mirror 42, and the concave mirror 43 which are arranged in the order of proximity of the image display device 30 along an emission direction of the image light L. Furthermore, the virtual image optical system 40 includes a mirror drive unit 44 configured to rotate the concave mirror 43.

The lens unit 41 is an assembly of at least one or more lenses for adjusting an optical distance from the image display device 30 to the folding mirror 42.

The folding mirror 42 is a mirror that folds back the optical path of the image light L emitted from the lens unit 41 toward the concave mirror 43.

The concave mirror 43 is a member that reflects the image light L, which has been reflected by the folding mirror 42, toward the housing opening 51. The concave mirror 43 is rotated by the mirror drive unit 44.

Figure 2:
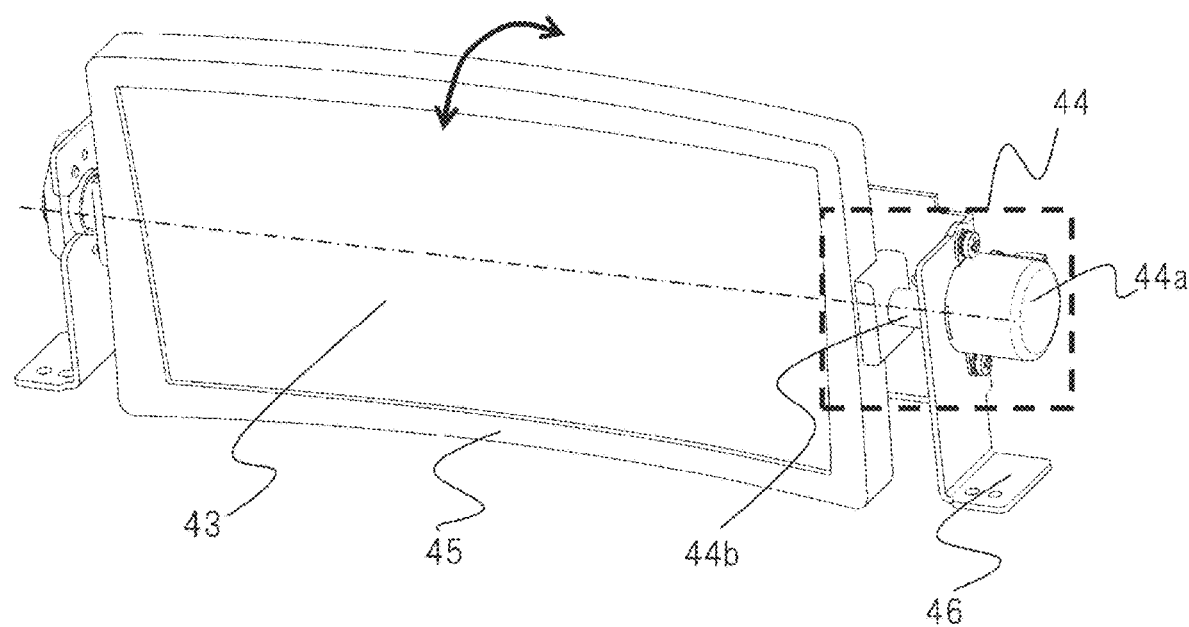
FIG. 2 is an enlarged configuration diagram of a mirror drive unit.

FIG. 2 is an enlarged configuration diagram of the mirror drive unit 44.

The mirror drive unit 44 includes a mirror motor 44a, a rotary shaft 44b of the mirror motor 44a, a mirror cover 45 which accommodates the concave mirror 43 and is connected to a distal end portion of the rotary shaft 44b, and a mirror holder 46 which is a bearing member of the rotary shaft 44b.

As illustrated in FIG. 1, the mirror motor 44a is connected to the HUD controller 20 via a bus 61. The mirror motor 44a is driven in accordance with a control signal from the HUD controller 20. When the mirror motor 44a is driven, the rotary shaft 44b is rotated accordingly, and then the mirror cover 45 connected thereto is rotated. As a result, the concave mirror 43 is rotated integrally with the mirror cover 45.

The concave mirror 43 is rotated, and accordingly, the image light L can be reflected toward the wind shield 3 by changing a reflection angle thereof. When the reflection angle of the image light L is changed, a reflection position of the image light L on the wind shield 3 is changed, thereby making it possible to change the optical path length of the image light L. When the optical path length is changed, distance of a virtual image plane on which the virtual image 100 is displayed is also changed, and when the reflection position is changed, the display height of the virtual image plane is also changed.

The dashboard 4 is provided with a light shielding hood 10 for shielding incidence of direct sunlight to the HUD 1. The light shielding hood 10 is disposed on an end portion of the dashboard opening 7 at the side closer to the wind shield 3. On the light shielding hood 10, a camera 70 is installed at a position and in an orientation so as to include the antiglare plate 52 within its angle of view. The camera 70 is connected to the HUD controller 20 via a communication line 62, and an image captured by the camera 70 is output to a viewpoint detection device 700 which will be described later (see FIG. 4). In the case where the HUD controller 20 has the function of the viewpoint detection device 700, the image is output to the HUD controller 20.

Figure 3:
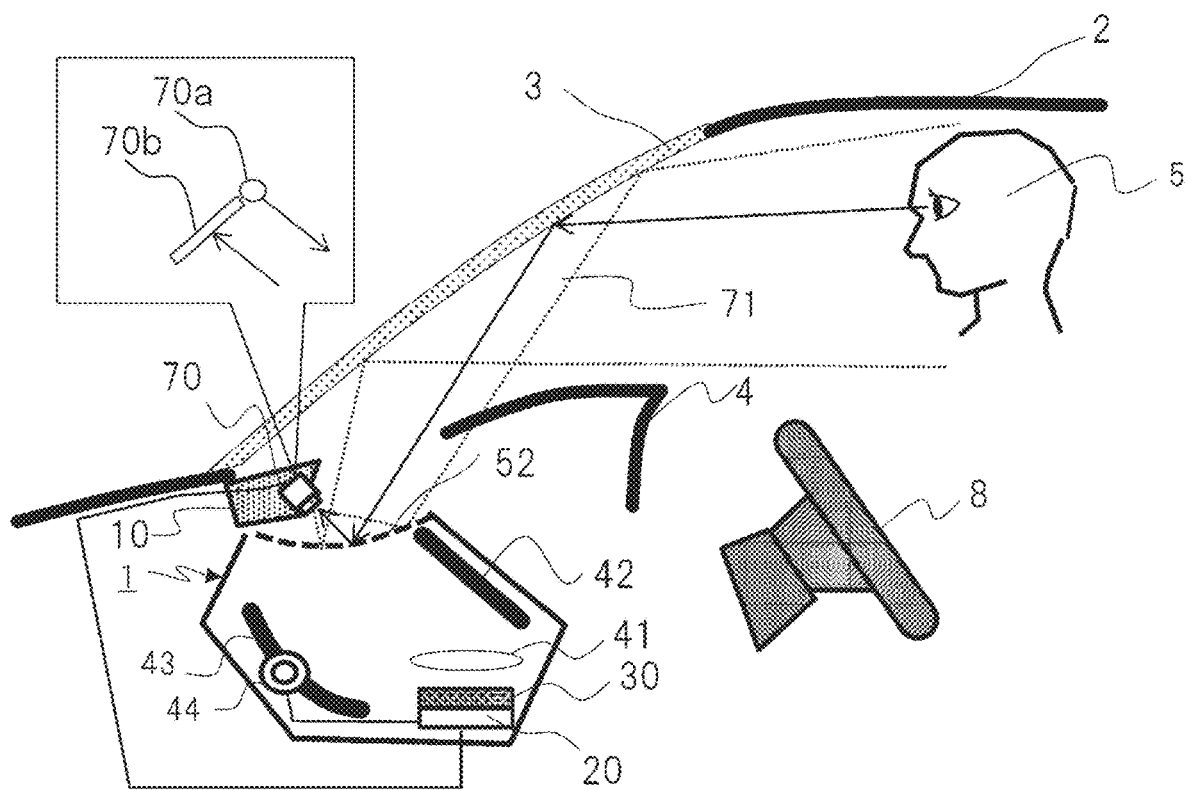
FIG. 3 illustrates an angle of view of a camera.

The image captured by the camera 70 is used for both processing of detecting a viewpoint of the driver 5 and processing of monitoring an incidence amount of direct sunlight to the HUD 1. Accordingly, the image captured by the camera 70 needs to include therein both the eye of the driver 5 and the antiglare plate 52. In the present embodiment, as illustrated in FIG. 3, the camera 70 is installed on the light shielding hood 10 such that the lens thereof is directed toward the antiglare plate 52. In addition, the camera 70 is installed on the light shielding hood 10 at an attachment position and in an orientation (angle of view) in which the light reflected by a face surface including the eye of the driver 5 is reflected by the wind shield 3, reaches the antiglare plate 52, is reflected by a surface of the antiglare plate 52, and made incident on the lens of the camera 70. The attachment position of the camera 70 with respect to the antiglare plate 52 and the orientation of the lens are ones of the technical features of the HUD 1 according to the present embodiment.

The camera 70 is mounted with a near-infrared light source 70a such as an LED that emits a near-infrared light, and a CMOS 70b as an image element that detects a light in a range from the near-infrared light to the visible light. For viewpoint detection processing, the near-infrared light is used. That is, the near-infrared light generated by the near-infrared light source 70a mounted on the camera 70 reaches the face surface (face area) including the eye of the driver 5 and is reflected thereby, and the reflected near-infrared light reaches the antiglare plate 52, is reflected again toward the CMOS 70b, and then made incident on the CMOS 70b. The camera 70 generates a face image of the driver 5 by the near-infrared light image based on an output from the CMOS 70b. Accordingly, even when the outside is dark, for example, at nighttime, in a tunnel, or in the underground parking space, viewpoint detection of the driver 5 can be performed.

On the other hand, for processing monitoring the incidence amount of sunlight, the visible light is used. The visible light having reached the antiglare plate 52 is made incident on the CMOS 70b from the antiglare plate 52. The camera 70 generates an outer surface image of the antiglare plate 52, which is a visible light image, based on an output from the CMOS 70b.

FIG. 3 illustrates an angle of view of the camera 70.

Generally, a gaze direction of the driver 5 in which the driver 5 visually recognizes the virtual image 100 has a depression angle (e.g., 1° to 5°) with respect to the horizontal direction. When aligning the optical axis of the camera 70 to the optical path of the image light L to capture an image of the driver 5, the driver 5 is imaged in a state of lowering the eyes. Accordingly, accuracy of detecting the coordinates of the eyes is reduced as compared with the case where the line of sight is directed in the horizontal direction.

In the present embodiment, as illustrated in FIG. 3, the camera 70 is installed in an orientation and on a position in which the optical axis of the camera 70 is aligned so as to capture an image of the face surface including the eye at a nearly horizontal angle (angle which is closer to the horizontal angle than the case of taking an image of the eye along the optical axis of the image light L). For example, the camera 70 is installed in an orientation in which the optical axis of the camera 70 is made incident on the eye point center of the driver 5 at an angle within an acceptable range in which the optical axis of the camera 70 is regarded as being horizontal with respect to the horizontal axis. Accordingly, it is possible to capture an image of the eye of the driver 5 directed to a nearly horizontal direction so as to output an image which is an almost front image. As a result, improvement of the accuracy of the viewpoint detection processing in step S20, which will be described later, can be expected.

Figure 4:
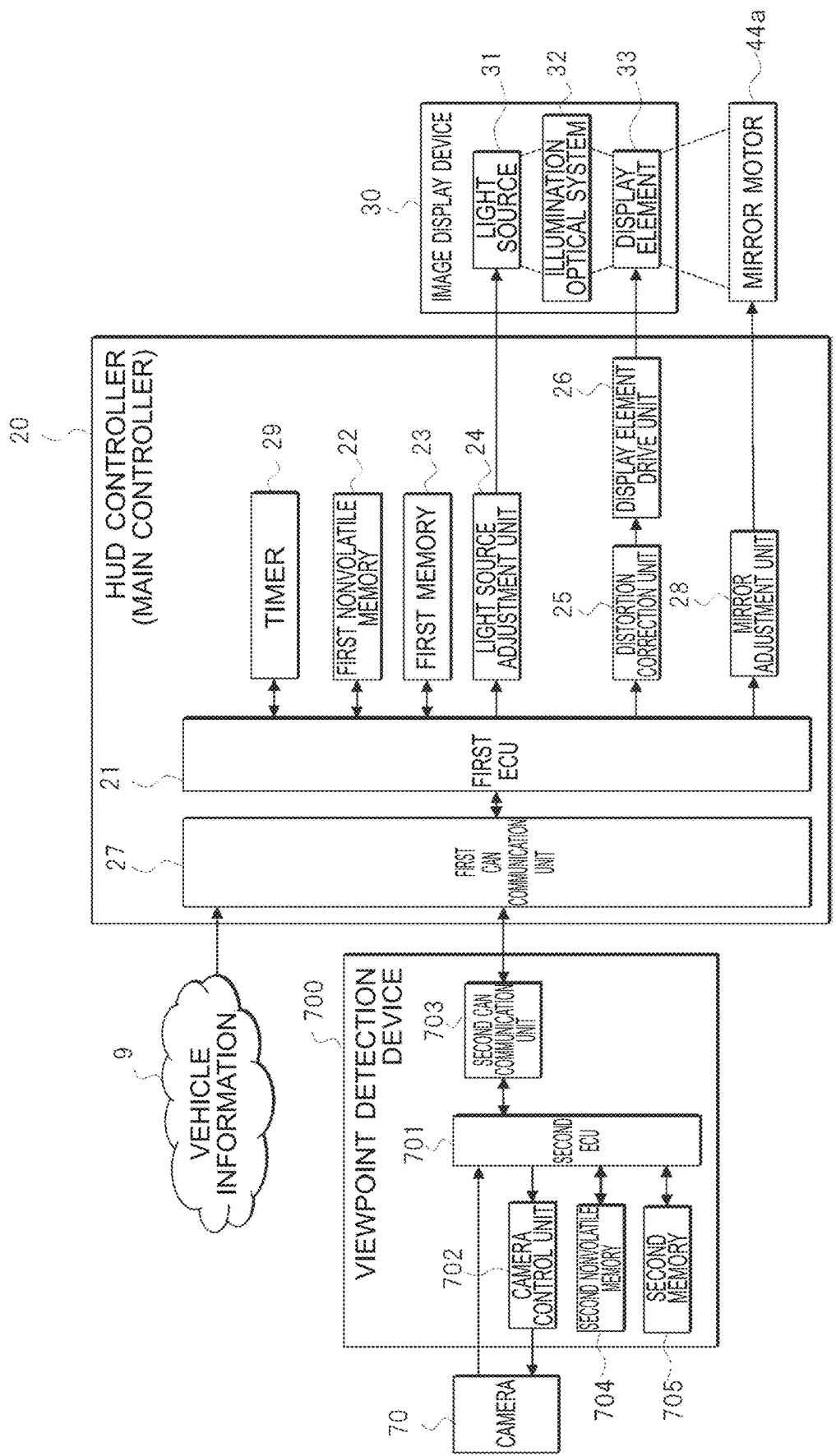
FIG. 4 is a system configuration diagram of an HUD.

FIG. 4 is a system configuration diagram of the HUD 1.

The HUD controller 20 includes a first ECU (Electric Control Unit) 21, a first nonvolatile memory 22, a first memory 23, a light source adjustment unit 24, a distortion correction unit 25, a display element drive unit 26, a first CAN communication unit 27 (CAN: Controller Area Network), a mirror adjustment unit 28, and a timer 29, which are connected to the first ECU 21 via a system bus. The first CAN communication unit 27 is connected to the viewpoint detection device 700 via a CAN. The light source adjustment unit 24 is connected to the light source 31, the display element drive unit 26 is connected to the display element 33, and the mirror adjustment unit 28 is connected to the mirror motor 44a. The first ECU 21 is configured to acquire vehicle information 9 such as speed and engine rotational speed from the first CAN communication unit 27 via the CAN provided in the vehicle 2, and displays the display object including the vehicle information 9 as the virtual image 100.

The viewpoint detection device 700 includes a second ECU 701, a camera control unit 702, a second CAN communication unit 703, a second nonvolatile memory 704, and a second memory 705. An input stage of the second ECU 701 is connected to an output stage of the camera 70, and images captured by the camera 70 are transmitted from second CAN communication unit 703 to the HUD controller 20 via the second ECU 701. The second ECU 701 is connected to the camera control unit 702, the second nonvolatile memory 704, and the second memory 705, respectively.

Figure 5:
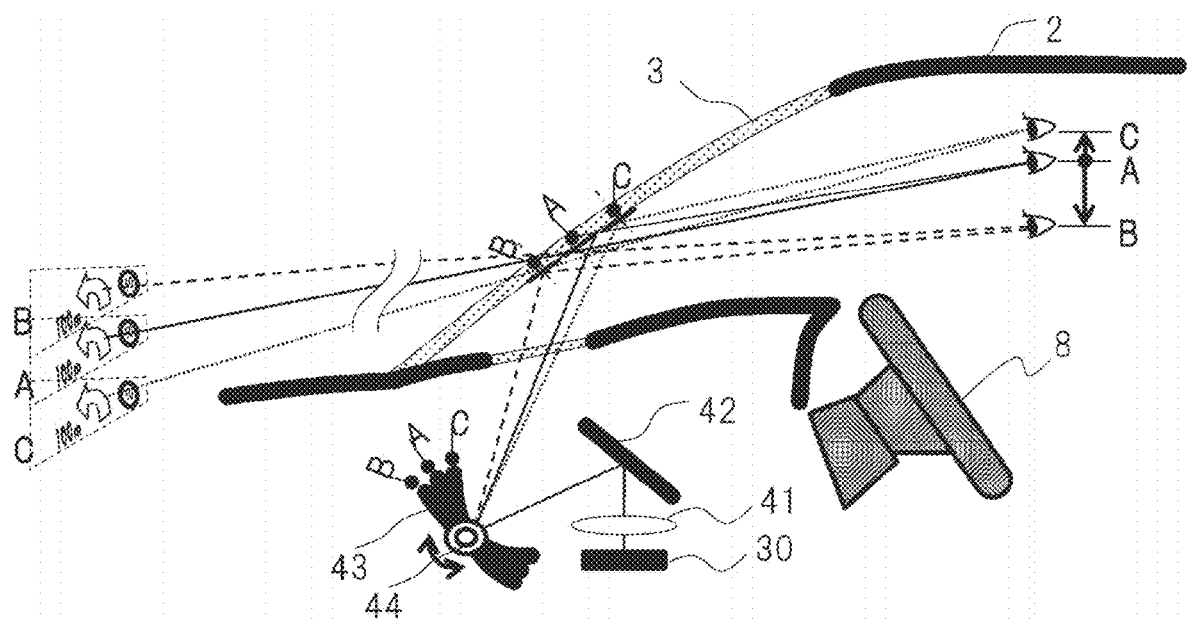
FIG. 5 illustrates relationship between a viewpoint, a reflection position of an image light L on a window shield, and a virtual image position thereof.

Next, with reference to FIG. 5, adjustment of a display position of the virtual image 100 in the HUD 1 of which the configuration has been described as above will be described. FIG. 5 illustrates relationship between a viewpoint, a reflection position of the image light L on the wind shield 3, and a virtual image position thereof.

In the HUD 1, the viewpoint detection device 700 detects the viewpoint by using the image taken by the camera 70. Then the HUD 1 controls a rotation angle of the concave mirror 43 in accordance with the detected viewpoint of the driver 5 (inclination angle) so as to perform control for adjusting the display position of the virtual image 100 to be projected on the wind shield 3 of the vehicle 2. In FIG. 5, corresponding to positions A, B, and C of the viewpoint of the driver 5, respective rotation (inclination) positions of the concave mirror 43, respective projection positions of the virtual image 100 on the wind shield 3, and respective positions of the virtual image 100 which can be seen from the viewpoint of the driver 5 are indicated by A, B, and C.

For example, the second CAN communication unit 703 of the viewpoint detection device 700 notifies viewpoint information to the HUD controller 20, and the HUD controller 20 rotates the concave mirror 43, thereby realizing the control described above. In the viewpoint detection device 700, acquisition of information from the camera 70 is performed under control of the second ECU 701. In the HUD controller 20, acquisition of the vehicle information 9, control of the image display device 30, and drive of the concave mirror 43 are performed under control of the first ECU 21. Meanwhile, the present invention is not necessarily limited thereto, and other types of devices may be provided.

Figure 6:
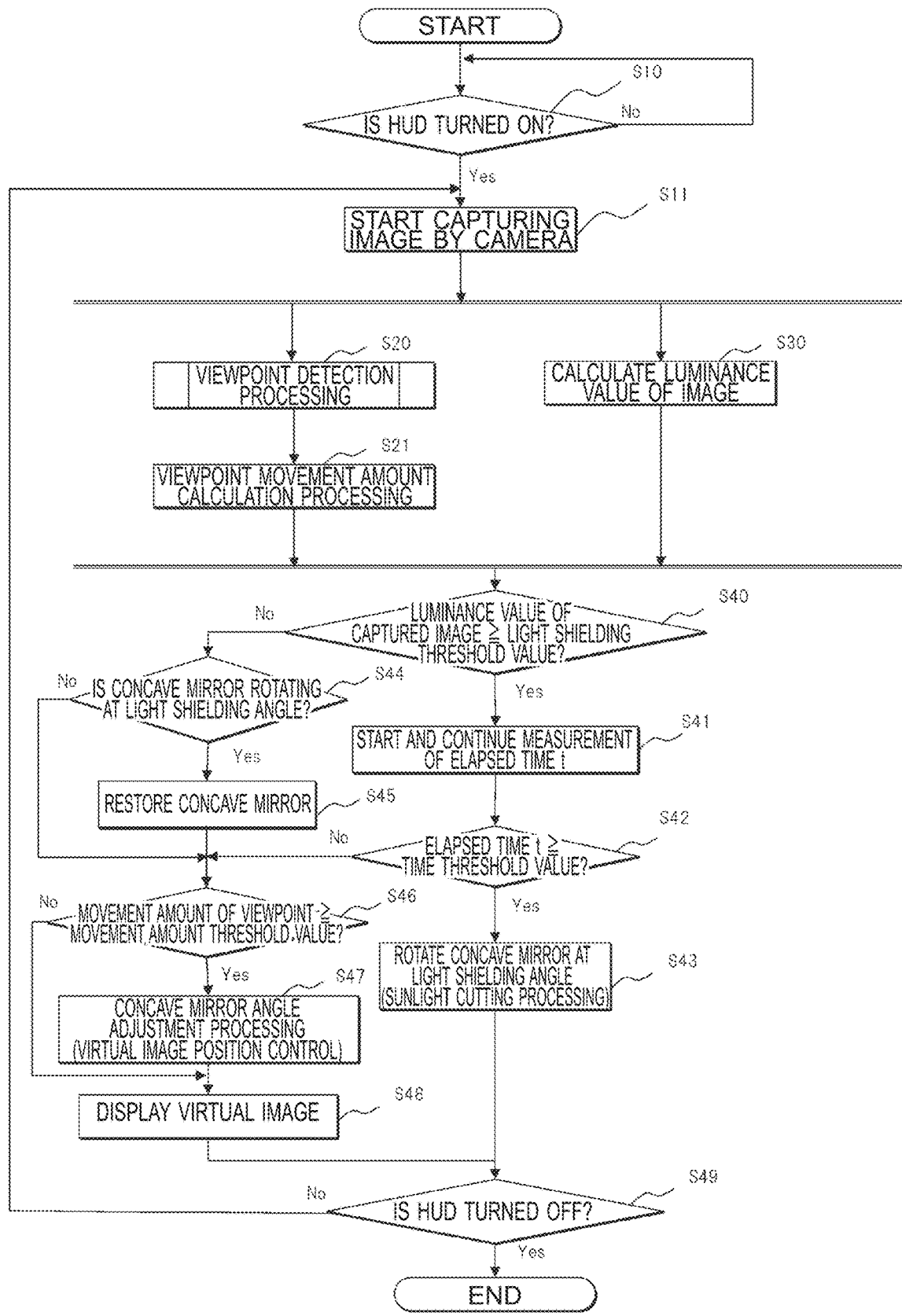
FIG. 6 illustrates a flow chart of a processing flow by an HUD.

FIG. 6 illustrates a flow chart of a processing flow by the HUD 1.

Another one of the technical features of the HUD 1 is to additionally use the image captured by the camera 70 for the processing of adjusting the virtual image position in accordance with the viewpoint of the driver 5 and the processing of monitoring the incidence amount of sunlight to the HUD 1.

When the HUD 1 is turned on (step S10/Yes), the camera 70 starts capturing an image (step S11) and outputs the captured image to the viewpoint detection device 700. In the captured image above, an emission area 52a of the image light L on the antiglare plate 52 is captured (see FIG. 15), and as a subject, the entire or a part of the face including the eye of the driver 5 which appears in the emission area 52a of the image light L is included. In the case where the near-infrared light reflected by the face surface of the driver 5 reaches a position different from the emission area 52a on the antiglare plate 52, the camera 70 captures a face image while including an area where the near-infrared light reaches within its angle of view.

The second ECU 701 of the viewpoint detection device 700 acquires an image from the camera 70 and executes the viewpoint detection processing (step S20). Details thereof will be described later.

The second ECU 701 calculates a viewpoint movement amount which is a difference between the viewpoint position obtained in step S20 and the viewpoint position used at the time of currently determining the display position of the virtual image 100 in the HUD 1 (step S21), and transmits the calculated viewpoint movement amount to the HUD controller 20. Details thereof will be described later.

Figure 7:
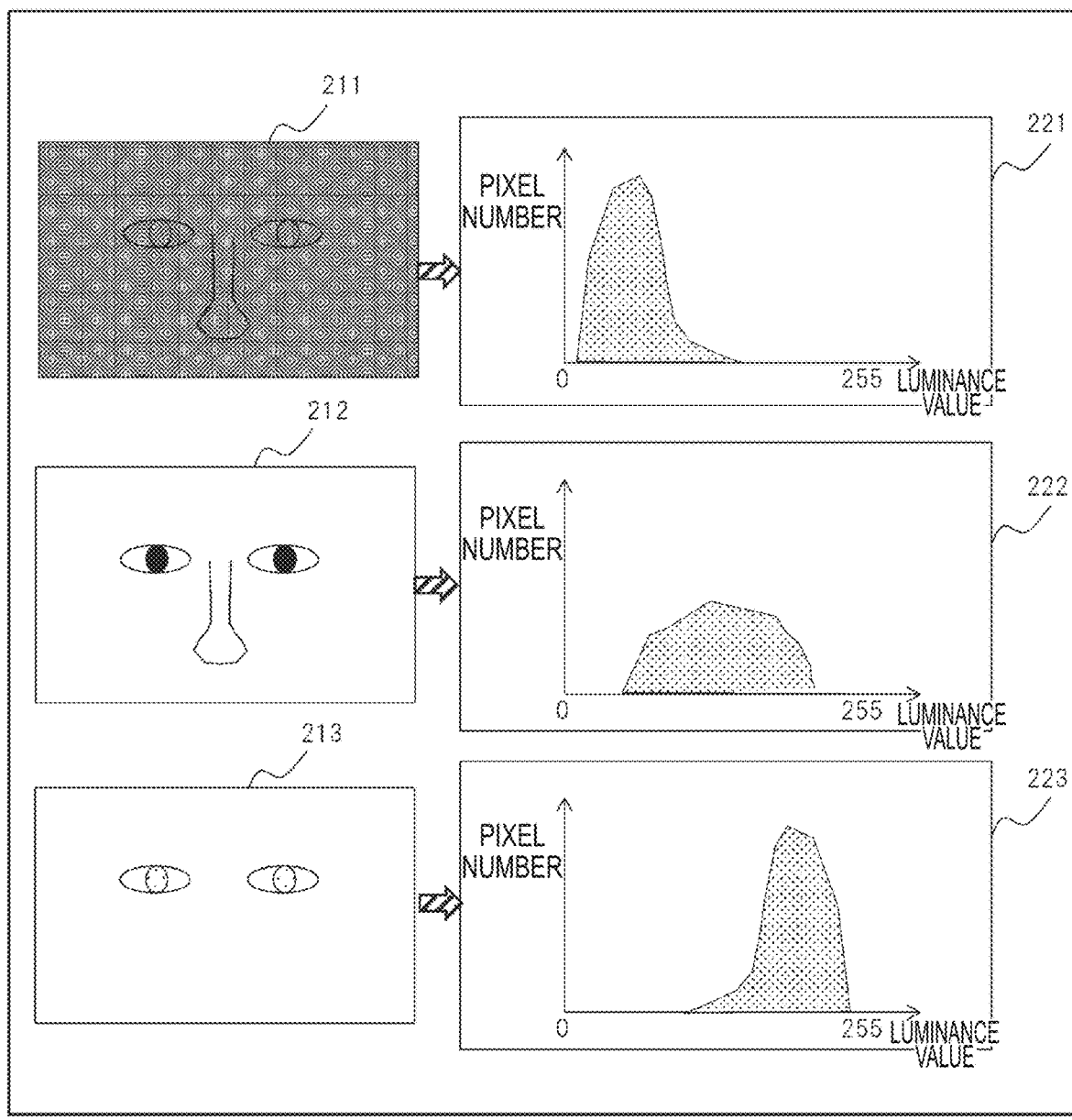
FIG. 7 illustrates images respectively captured in states where luminance is different thereamong, and each histogram showing a distribution of luminance values of each image.

In parallel with the viewpoint detection processing (step S20), the second ECU 701 calculates luminance values of the image captured by the camera 70 (step S30). In the present embodiment, with reference to FIG. 7, an example in which the second ECU 701 calculates the luminance values of the entire image will be described. Meanwhile, the luminance values of a partial region such as a central region of the image may be detected rather than those of an entire image region. FIG. 7 illustrates images respectively captured in states where luminance is different thereamong, and each histogram showing a distribution of luminance values of each image.

In a second image 212 captured at the standard luminance, which is for example, the luminance which allows the driver 5 to drive without feeling glare too much and without turning on a headlight, a second histogram 222 showing a distribution of the luminance values of the second image does not have a large peak value, and the luminance values are dispersed. The area of the second histogram 222 (portion with color in FIG. 7) shows the total number of pixels of the image, and the area of the first histogram 221 and the area of the third histogram 223, which will be described later, are the same as the area of the second histogram 222.

On the other hand, a first histogram 221 showing a distribution of the luminance values of a first image 211 captured in a dark place has a large number of pixels of the dark luminance values. The third histogram 223 showing a distribution of the luminance values of a third image 213 captured in a place which is too bright, in other words, a place where the incidence amount of the sunlight to the antiglare plate 52 is large, has a large number of pixels of the bright luminance value.

The second ECU 701 obtains the luminance values of each of the images as an integrated value (luminance values×luminance numbers) and outputs the integrated value to the HUD controller 20.

When determining that the luminance value of the image calculated in step S30 is equal to or greater than a predetermined light shielding threshold value (step S40/Yes), the first ECU 21 of the HUD controller 20 starts measurement of an elapsed time t from a time since the luminance value of the image becomes equal to or greater than the light shielding threshold value by using the timer 29 (step S41). When the elapsed time t becomes equal to or greater than a predetermined time threshold value (step S42/Yes), the mirror adjustment unit 28 rotates the concave mirror 43 to form an angle at which the sunlight does not reach the image display device 30 (hereinafter referred to as "light shielding angle") (step S43). At this point, measurement of time by the timer 29 may be ended.

Figure 8:
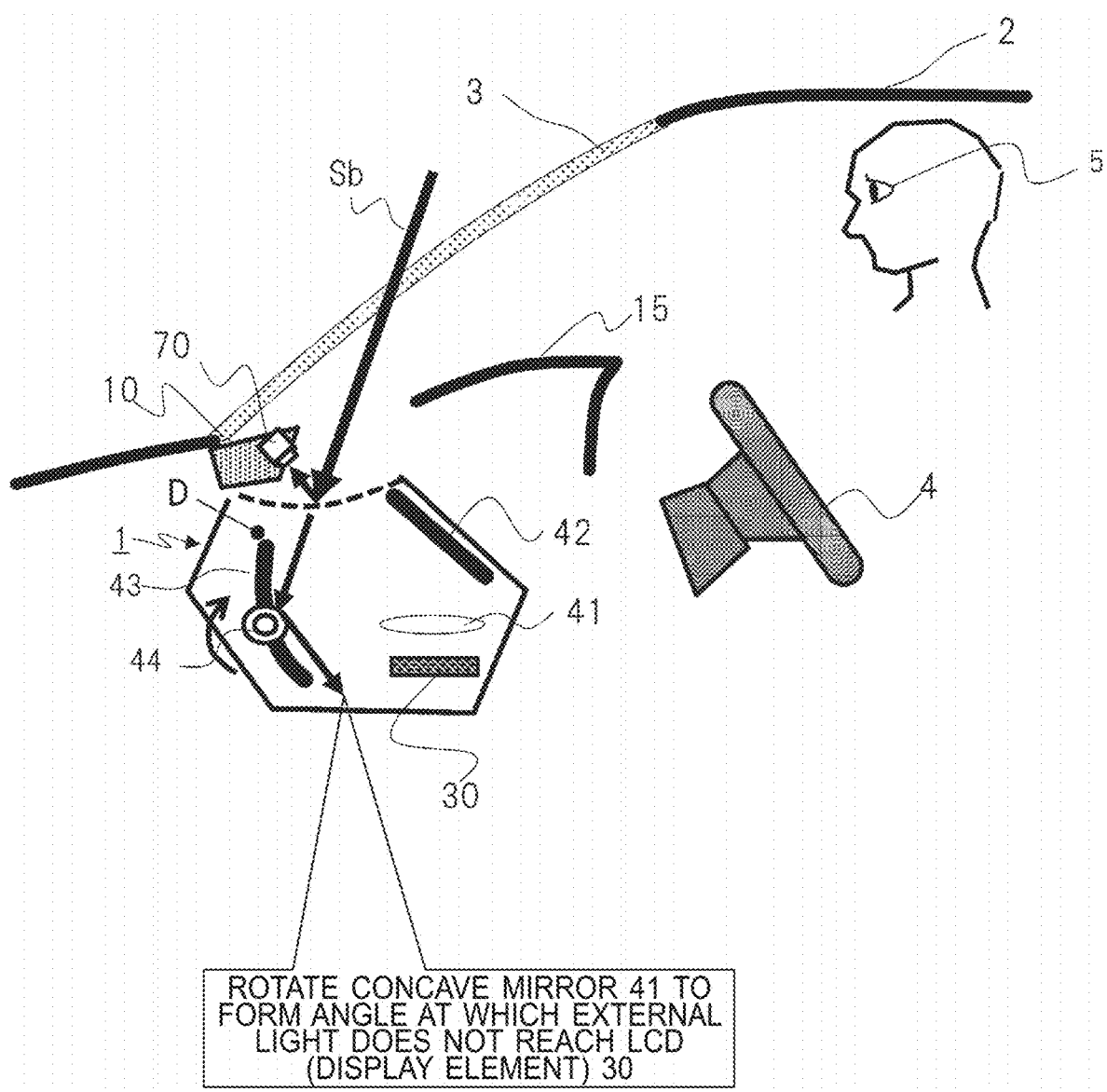
FIG. 8 illustrates a state where a concave mirror is rotated at a light shielding angle.

FIG. 8 illustrates a state where the concave mirror 43 is rotated at the light shielding angle.

A part of the sunlight Sb having reached the antiglare plate 52 is reflected thereby and enters the camera 70, and the other part thereof is transmitted through the antiglare plate 52 and reaches the concave mirror 43. When rotating the concave mirror 43 to form the light shielding angle, the sunlight Sb having reached the concave mirror 43 is reflected by a mirror surface of the concave mirror 43 toward a direction of a lower portion of the housing 50, in other words, in a direction different from a direction toward the folding mirror 42.

With this configuration, since the image light L is no longer irradiated toward the antiglare plate 52, display of the virtual image 100 disappears. In addition, the optical path in which the sunlight Sb made incident from the antiglare plate 52 passes through the concave mirror 43 and the folding mirror 42 and reaches the image display device 30 also can be blocked. Furthermore, it is possible to prevent the sunlight Sb made incident from the antiglare plate 52 from being reflected by the concave mirror 43 and irradiated toward the antiglare plate 52 again, thereby preventing it from being irradiated to the wind shield 3.

On the other hand, when the luminance value of the image is less than the light shielding threshold value (step S40/No), in the case where the concave mirror 43 is being rotated at the shielding angle, that is, in the case where the luminance value of the image is equal to or greater than the shielding threshold value and thus the mirror surface of the concave mirror 43 is withdrawn from the optical path of the image light L (step S44/Yes), the first ECU 21 makes the mirror adjustment unit 28 return (restore) the mirror surface of the concave mirror 43 to the optical path of the image light L (step S45).

After completion of step S45, or when the concave mirror 43 is not being rotated at the light shielding angle (step S44/No), that is, when the mirror surface of the concave mirror 43 is on the optical path of the image light L or when the elapsed time t is less than the time threshold value (step S42/No), the first ECU 21 compares a movement amount of the viewpoint with a predetermined movement amount threshold value (step S46).

When the movement amount of the viewpoint is equal to or greater than the movement amount threshold (step S46/Yes), the first ECU 21 makes the mirror adjustment unit 28 execute mirror adjustment processing for aligning the virtual image position to the viewpoint (step S47). More specifically, the mirror adjustment unit 28 outputs a signal for rotating the concave mirror 43 in accordance with the viewpoint movement amount calculated in step S21 to the mirror motor 44a. With this configuration, the virtual image can be displayed in accordance with the position of the viewpoint detected by the viewpoint detection device 700.

After performing the mirror adjustment processing (step S47) or when the movement amount of the viewpoint is less than the movement amount threshold value (step S46/No), the first ECU 21 makes the distortion correction unit 25 correct distortion of the display object to be displayed as the virtual image 100, and makes the display element drive unit 26 display, on the display element 33, the display object of which the distortion has been corrected. At the same time, the first ECU 21 makes the light source adjustment unit 24 execute lighting processing of the light source 31, and makes the display element 33 emit the image light L including the display object. The image light L is enlarged by the virtual image optical system 40 and projected onto the wind shield 3, and made incident on the eye of the driver 5, whereby the virtual image 100 is displayed (step S48). When the HUD 1 is not turned off (step S49/No), the processing returns to step S11, and the subsequent steps are repeated. When the HUD 1 is turned off (step S49/Yes), the virtual image display processing by the HUD 1 is terminated.

<Step S20: Viewpoint Detection Processing>

Figure 9:
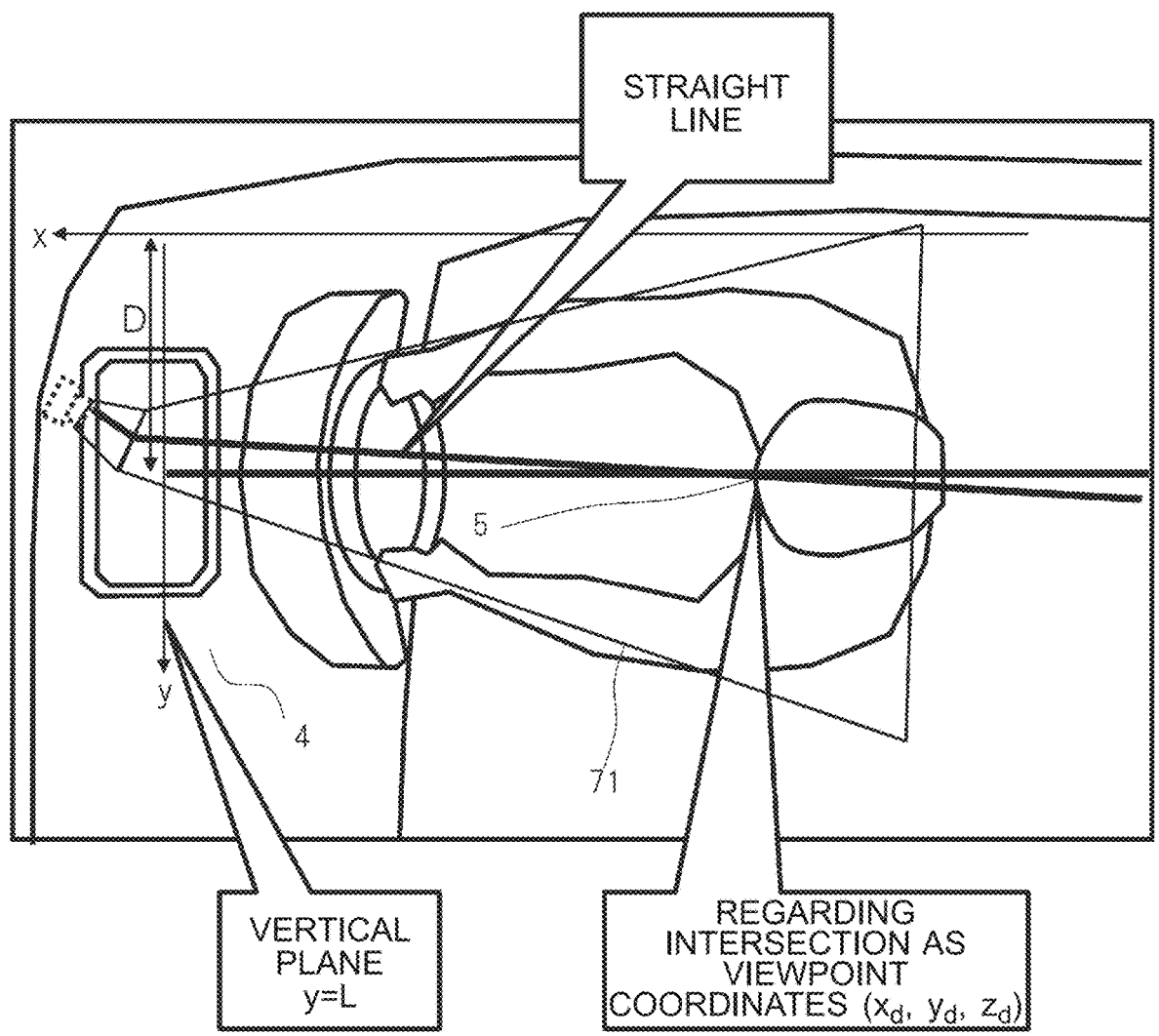
FIG. 9 illustrates a three-dimensional space coordinate system inside a vehicle.

FIG. 9 illustrates a three-dimensional space coordinate system inside the vehicle 2.

Inside the vehicle 2, the camera 70 is disposed on a position where the camera 70 can capture an image of the face of the driver 5 (viewpoint), in the present embodiment, is fixed to the inside of the light shielding hood 10 (see FIG. 3). In other words, the camera 70 is disposed on the center of a three-dimensional space coordinates inside the vehicle 2 while setting the x-axis on the length direction of the vehicle 2 (traveling direction of the vehicle), the y-axis on the width direction thereof, and the z-axis on the height (vertical) direction thereof. FIG. 9 illustrates this state as viewed from above. The camera 70 captures an image including the face (viewpoint) from the front of the driver 5 in the three-dimensional space inside the vehicle with the camera being disposed on the center thereof. The reference sign 71 in FIG. 9 indicates an image capturing range of the camera 70.

The second ECU 701 detects the eye (viewpoint) based on a two-dimensional camera image captured by the camera 70. Subsequently, the second ECU 701 obtains a straight line extending toward the eye (viewpoint) of the driver 5 (that is, connecting the camera 70 and the viewpoint) detected by the camera 70 (origin of the three-dimensional space). Thus, it is possible to specify the straight line extending toward the direction of the eye (viewpoint) of the driver 5 when viewed from the origin of the three-dimensional space which is the camera 70. In other words, based on the relationship between the installation direction and the angle of view of the camera 70, by specifying one point (position of the eye of the driver 5 in the above) on the camera image (two-dimensional image), the straight line on the three-dimensional space, which connects the camera 70 and the one point on the image, can be obtained. In this connection, it is not possible to limit on which position of the straight line the eye is located.

Subsequently, an intersection of the determined straight line on the three-dimensions and a vertical plane (z-x plane) on the three-dimensions passing through the center of a seat (or, the central axis of a steering wheel 8) is obtained. The obtained intersection is the viewpoint position which is the eye of the driver 5. The vertical plane (z-x plane) on three-dimensions passing through the center of the seat (central axis of the steering wheel) is the z-x plane which is apart by a distance from the camera 70 (origin) to the center of the seat in the width direction (y-axis) of the vehicle 2, and the distance can be preset when placing the camera 70 inside the vehicle 2, or obtained by measurement.

That is, the second ECU 701 obtains viewpoint coordinates $(x_d, y_d, z_d)$ of the driver 5 by the above-described viewpoint detection processing based on the face of the driver 5 captured by the camera 70, and stores it in the second nonvolatile memory 704. The obtained viewpoint coordinates are used in the viewpoint movement amount calculation processing (step S21) using the image captured by the camera 70 at a next sampling period.

<S21: Viewpoint Movement Amount Calculation Processing>

Figure 10A:
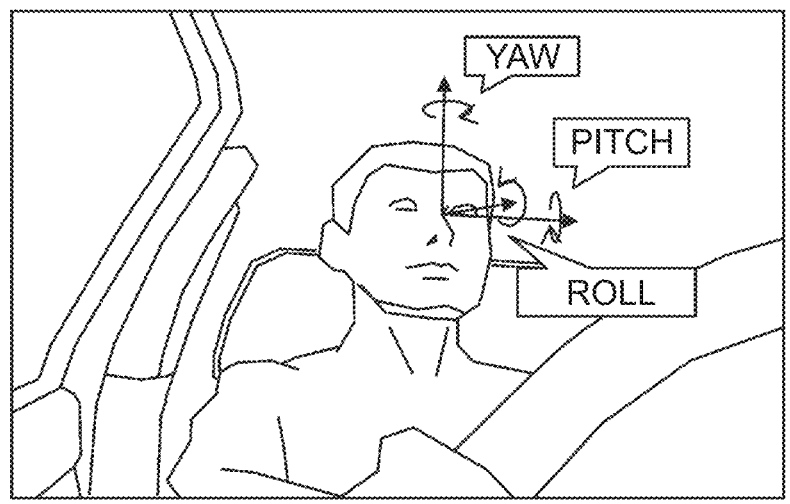
FIG. 10A explains a viewpoint movement amount in accordance with movement of the head of a driver.
Figure 10B:
FIG. 10B explains a viewpoint movement amount in accordance with movement of the head of a driver.
Figure 10C:
FIG. 10C explains a viewpoint movement amount in accordance with movement of the head of a driver.

When the driver 5 bends forward or moves his or her head, the viewpoint position may be shifted. The second ECU 701 estimates the orientation of the face of the driver 5 based on the image captured by the camera 70, determines whether the face of the driver 5 is positioned on the center of the seat based on the estimated direction of the face, and performs position adjustment of the concave mirror 43. FIG. 10A, FIG. 10B, and FIG. 10C explain the viewpoint movement amount in accordance with the movement of the head of the driver.

As illustrated in FIG. 10A, the second ECU 701 estimates the orientation of the face of the driver 5 (as indicated by the arrows in the drawing, the orientation of the three directions of roll, pitch, and yaw) based on the image captured by the camera 70, and when it is determined that the face of the driver 5 is facing the front of the vehicle, performs display position adjustment of the virtual image 100 by adjusting the angle of the concave mirror 43 based on the viewpoint coordinates $(x_d, y_d, z_d)$ of the driver 5 obtained as described above. As illustrated in FIG. 10B and FIG. 10C, when the orientation of the face of the driver 5 is deviated from the front of the vehicle, the second ECU 701 does not perform the display position adjustment of the virtual image 100 by adjusting the angle adjustment of the concave mirror 43. In the present embodiment, in order to particularly suppress the display position of the virtual image 100 from being changed frequently in accordance with fine movement of the head of the driver 5, the second ECU 701 obtains a difference $(\Delta x_d, \Delta y_d, \Delta z_d)$ between the previous viewpoint detection position $(x_{dt}, y_{dt}, z_{dt})$ and the current viewpoint detection position $(x_{dt+1}, y_{dt+1}, z_{dt+1})$, and when any of $\Delta x_d, \Delta y_d, \Delta z_d$ is equal to or greater than movement amount thresholds $\Delta x_{dth}, \Delta y_{dth}, \Delta z_{dth}$ which are set in advance for determining that the head of the driver 5 has moved, outputs, to the HUD controller 20, viewpoint movement amount information including the difference $(\Delta x_d, \Delta y_d, \Delta z_d)$.

According to the present embodiment, since detection of the viewpoint of the driver 5 is performed and the display position of the virtual image 100 is adjusted by following the detection result, it is possible to improve visibility of the virtual image 100.

Furthermore, since the camera 70 used in the viewpoint detection is installed in a blind spot as viewed from the driver 5, which is generated by the light shielding hood 10, appearance in the vehicle 2 is improved.

Still further, since the camera 70 captures an image of the face of the driver 5 appearing in the antiglare plate 52, the face image can be captured from substantially the front so that the viewpoint detection can be performed with high accuracy.

Still further, since the camera 70 can realize a function as a monitoring camera for monitoring the incidence amount of sunlight on the HUD 1, it is possible to reduce the number of components as compared with the case of preparing a monitoring member separately.

Still further, since the camera 70 is provided on a position which is withdrawn from the optical path of the image light L of the HUD 1, even after the incidence amount of sunlight becomes excessive and the optical path of the image light L is blocked, it is possible to monitor the incidence amount of sunlight. When the incidence amount becomes less than the light shielding threshold, the optical path of the image light L can be restored again.

The above-described embodiment does not limit the present invention, and various modifications within a scope that does not depart from the concept of the present invention belong to the technical scope of the present invention. For example, the calculation formula used for explaining each processing is only one embodiment of the processing, and other calculation formulas that produce calculation results necessary for the processing may be applied.

The above-described embodiment uses, in order to light-shield the optical path of the image light L, the structure for withdrawing the mirror surface of the concave mirror 43 from the optical path of the image light L (rotating the mirror surface of the concave mirror 43 at the light shielding angle from the optical path of the image light L), meanwhile, the present invention is not limited thereto. FIG. 11 to FIG. 14 illustrate a shutter structure as a structure for light shielding the image light L.

Figure 11:
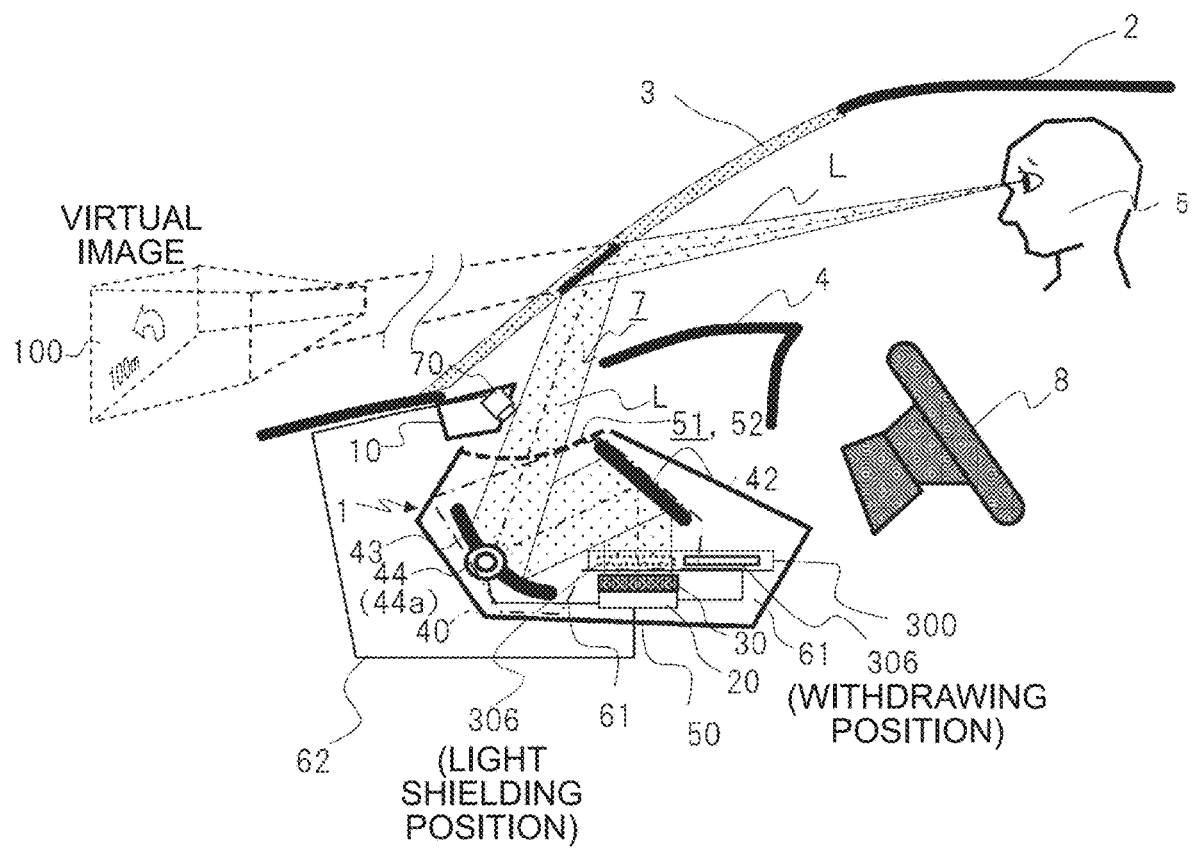
FIG. 11 is a schematic diagram illustrating an installation position of a shutter within an HUD.
Figure 12:
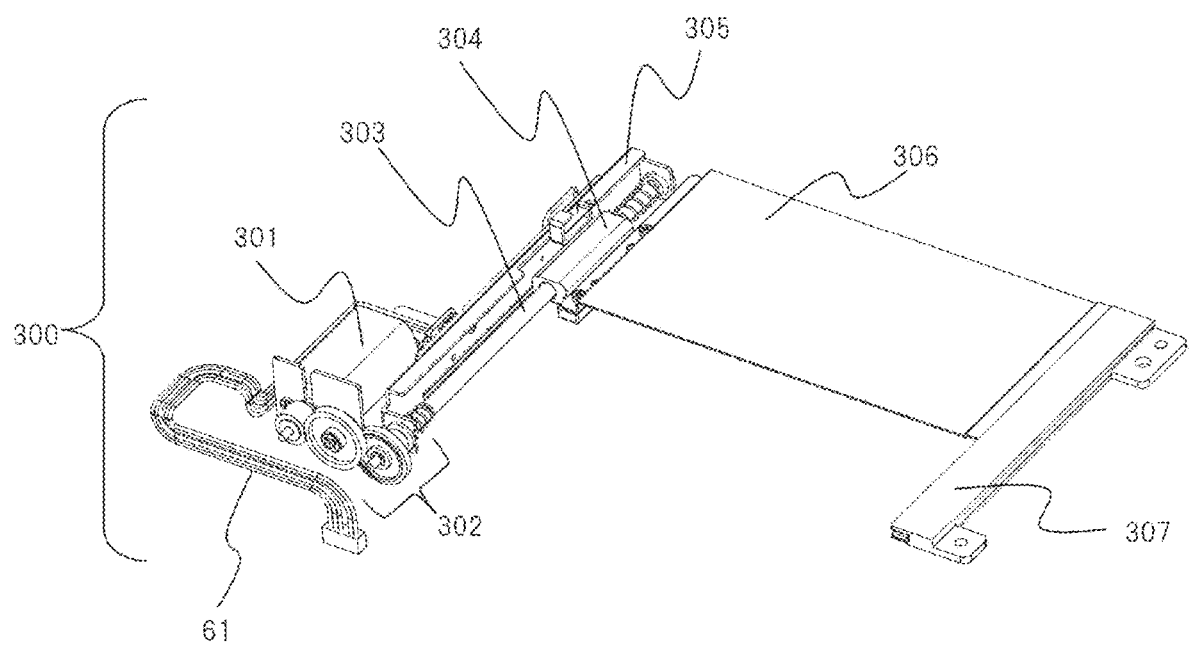
FIG. 12 is an enlarged diagram for explaining a shutter unit.
Figure 13:
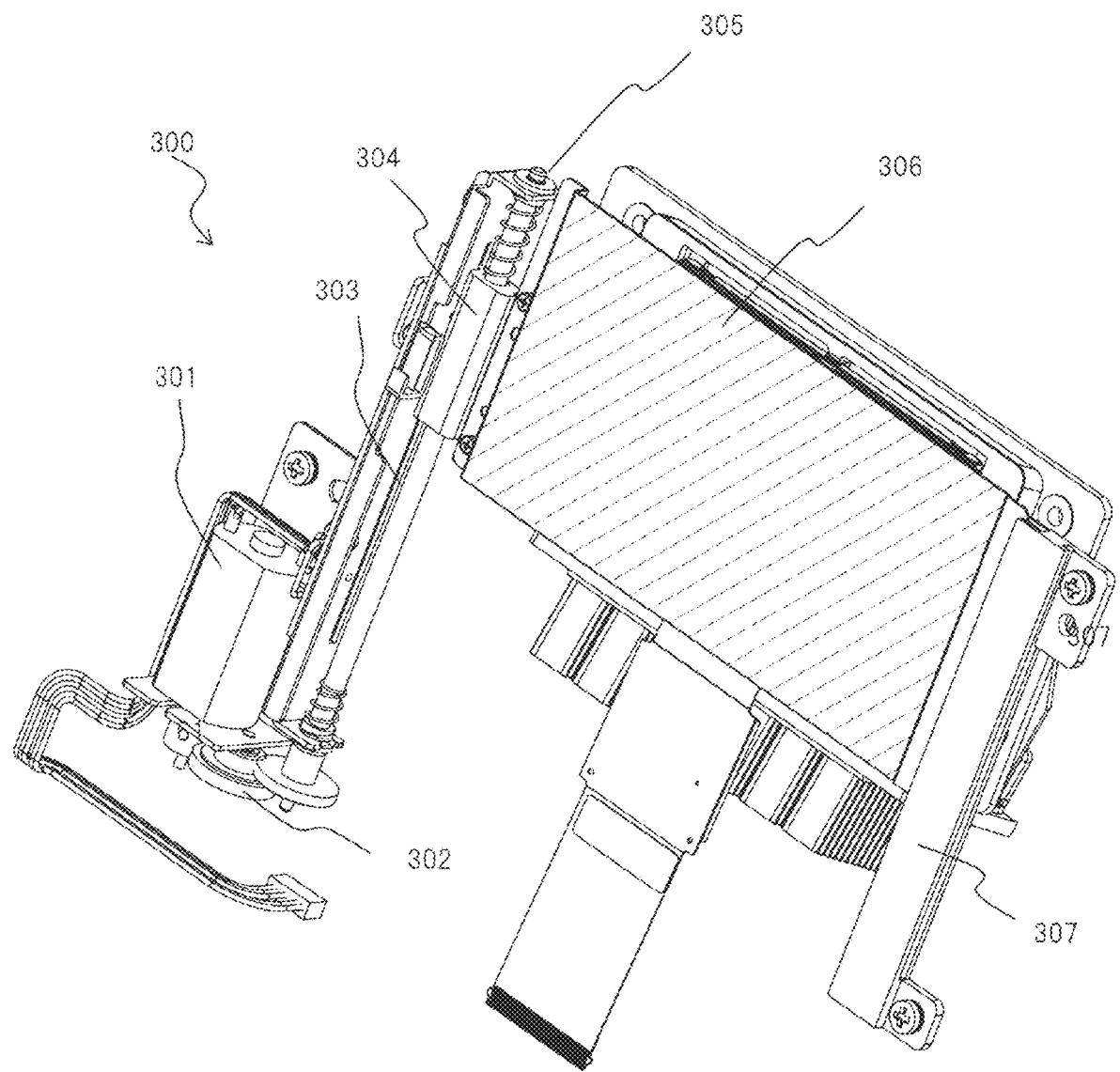
FIG. 13 illustrates a state where a shutter is in a light shielding position.
Figure 14:
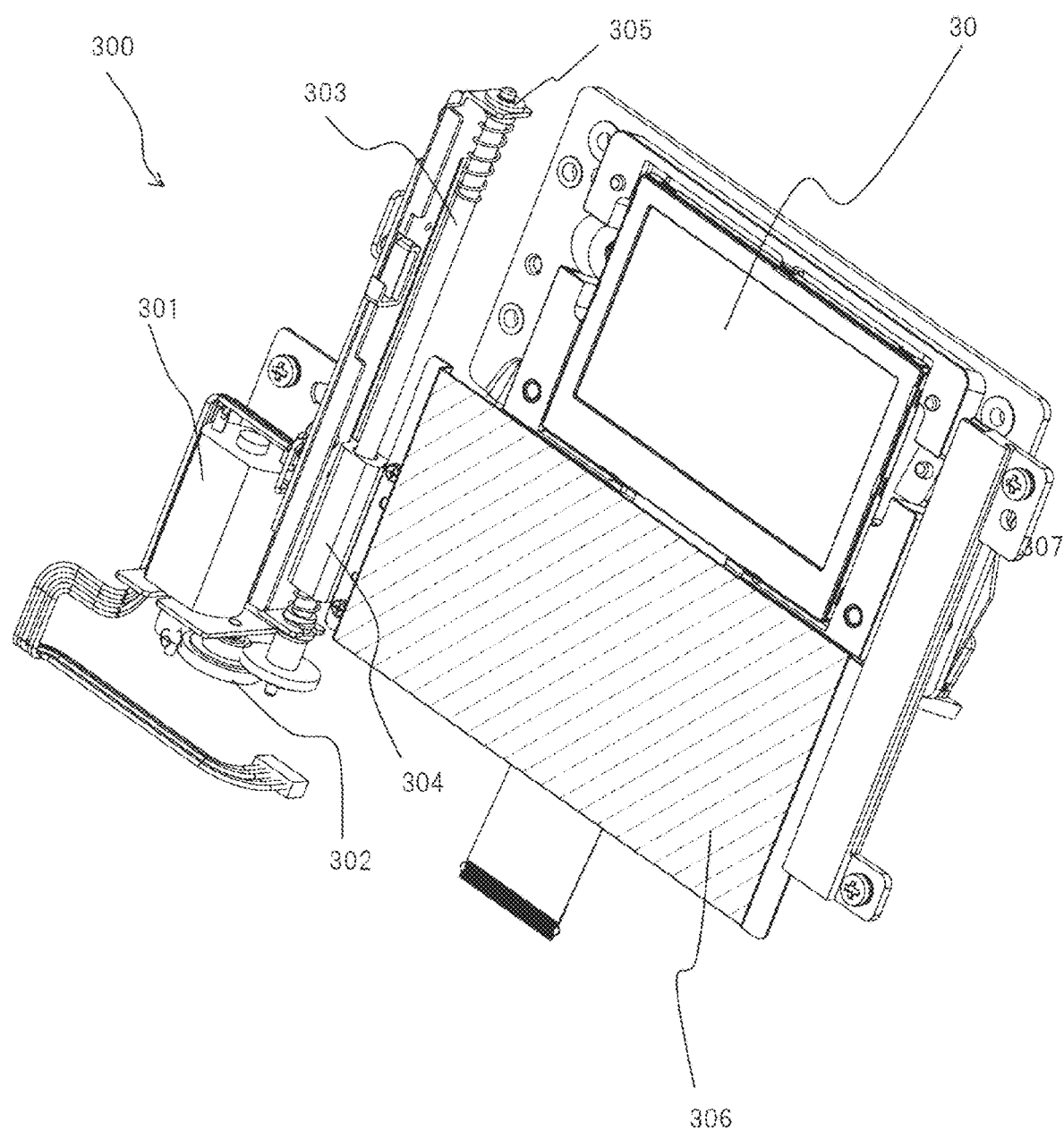
FIG. 14 illustrates a state where a shutter is in a withdrawn position.

FIG. 11 is a schematic diagram illustrating an installation position of a shutter 306 within an HUD 1*a*. FIG. 12 is an enlarged diagram for explaining a shutter unit 300. FIG. 13 illustrates a state where the shutter 306 is in a light shielding position. FIG. 14 illustrates a state where the shutter 306 is in a withdrawn position.

The HUD 1*a* illustrated in FIG. 11 includes a shutter unit 300 configured to place the shutter 306 in front of an emission surface of the image light L in the image display device 30 (surface facing the lens unit 41) or withdraw the shutter 306 therefrom. The shutter unit 300 is connected to the HUD controller 20 by the bus 61. The HUD controller 20 drives and controls the shutter unit 300 by placing the shutter 306 on the light shielding position (see FIG. 13) in step S43, and placing the shutter 306 on the withdrawn position (see FIG. 14) in step S45.

As illustrated in FIG. 12, the shutter unit 300 includes the shutter 306 and a movement mechanism for the shutter 306. The movement mechanism specifically includes a shutter motor 301, a gear train 302, a lead screw 303, a shutter holder 304, a lead screw holder 305, and a sliding guide 307. The shutter motor 301 is connected for communication to the HUD controller 20 via the bus 61. The lead screw holder 305 and the sliding guide 307 are attached to the housing 50.

A rotation axis of the shutter motor 301 is coupled to the gear train 302, and one end of the lead screw 303 is coupled to the gear train 302.

The other end of the lead screw 303 is held by the lead screw holder 305. A surface of the lead screw 303 is provided with threads.

The shutter holder 304 holds the shutter 306. A position of the shutter holder 304, which is opposite to the lead screw 303, is provided with screw grooves. The threads of the lead screw 303 and the screw grooves of the shutter holder 304 are engaged with each other.

The sliding guide 307 is installed to face the lead screw 303 via the shutter 306. A surface of the sliding guide 307, which is opposite to the shutter holder 304, is provided with a groove. An end portion of the shutter holder 304, which is opposite to the sliding guide 307, is inserted into the groove of the sliding guide 307. With this configuration, the shutter holder 304 and the shutter 306 are suppressed from wobbling when the shutter 306 moves from the withdrawn position to the light shielding position or from the light shielding position to the withdrawn position, thereby realizing stable movement.

When the HUD controller 20 transmits a forward rotation signal or a reverse rotation signal to the shutter motor 301, the shutter motor 301 is rotated accordingly in the forward direction or in the reverse direction. In accordance with the forward or reverse rotation of the rotation axis of the shutter motor 301, the lead screw 303 is rotated in the forward direction or in the reverse direction via the gear train 302. Then, the shutter holder 304 moves from the withdrawn position to the light shielding position or from the light shielding position to the withdrawn position along the threads of the lead screw 303. The shutter 306 moves integrally with the shutter holder 304 from the withdrawn position to the light shielding position or from the light shielding position to the withdrawn position. In the present example, the shutter unit 300 is disposed in front of the image display device 30, meanwhile, the installation position of the shutter unit 300 is not limited to the front of the image display device 30 as long as the shutter unit 300 is provided on the optical path of the image light L in the HUD 1*a*.

It has been described that the mirror adjustment unit 28 drives the mirror drive unit 44 in step S45, meanwhile, the mirror adjustment unit 28 may be configured to perform only the processing of storing a flag indicating that the mirror surface is rotating at the light shielding angle. Then, the mirror adjustment unit 28 may restore the concave mirror 43 simultaneously at the time of controlling the virtual image position in step S47. As a result, it is possible to reduce the drive frequency of the concave mirror 43.

Furthermore, it has been described that, when the virtual image display (step S48) is not turned off after rotation of the concave mirror 43 at the light shielding angle in step S43 and executed in the previous processing, the concave mirror 43 is rotated at the light shielding angle while the virtual image display processing is executed. However, generation of the image light L after rotating the concave mirror 43 at the light shielding angle, which is not related to display of the virtual image, is a wasteful process. Accordingly, a process of turning off the virtual image, for example, turning off the light source 31 or hiding the display object in the display element 33 may be added after step S43. In this case, when the virtual image is displayed in step S48 next time, a process of turning on the light source 31 or displaying the display object in the display element 33 is resumed.

Figure 15:
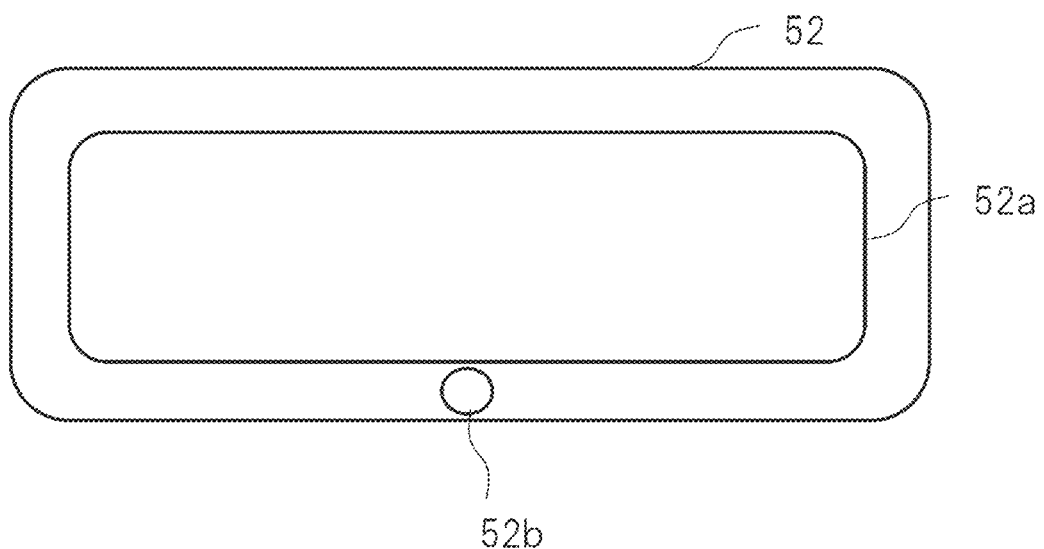
FIG. 15 illustrates another embodiment in which an antiglare plate is provided with a reflective member.

FIG. 15 illustrates another embodiment in which the antiglare plate 52 is provided with a reflective member 52*b*. In FIG. 14, an area of the antiglare plate 52, which is different from the emission area 52*a* of the image light L, is provided with the reflective member 52*b* for reflecting a natural light (including the near-infrared light to a visible light). The reflective member 52*b* reflects, toward the camera 70, the natural light which has been reflected by the face surface of the driver 5, passed through the wind shield 3, and reached the antiglare plate 52. The reflective member 52*b* may be, for example, an aluminum plate or a mirror. With the reflective member 52*b*, it is possible to capture a face image of the driver 5 more clearly by the camera 70.

REFERENCE SIGNS LIST

1: HUD
2: vehicle

3: wind shield
4: dashboard
5: driver
7: dashboard opening
10: light shielding hood
20: HUD controller
30: image display device
40: virtual image optical system
43: concave mirror
44: mirror drive unit
50: housing
51: housing opening
52: antiglare plate
70: camera
100: virtual image
700: viewpoint detection device

The invention claimed is:

1. A head-up display for displaying a virtual image in front of a vehicle, the head-up display comprising:
   an image display device including a light source and a display element, which is configured to display a display object on the display element and emit an image light including the display object;
   a virtual image optical system configured to change an emission direction of the image light and enlarge and project the image light toward to a projection target member;
   a housing that accommodates the image display device and the virtual image optical system;
   a housing opening provided in the housing, through which the image light is emitted from the housing;
   an antiglare plate that covers the housing opening and transmits the image light;
   a camera configured to capture an image of a face area including an eye of a driver of the vehicle;
   a viewpoint detection device configured to detect a viewpoint of the driver based on the image captured by the camera; and
   a main controller connected to each of the image display device, the virtual image optical system, and the viewpoint detection device,
   wherein
   the camera is installed on a position which is outside the housing and withdrawn from an optical path of the image light emitted through the housing opening, as well as in an orientation for capturing an image of an area where a face including the eye of the driver is reflected on the antiglare plate, and
   the main controller is configured to perform control to adjust an emission direction of the image light based on a viewpoint position of the driver which has been detected by the viewpoint detection device.

2. The head-up display according to claim 1, wherein the camera includes an image element configured to detect a near-infrared light, and outputs an image including a near-infrared light image.

3. The head-up display according to claim 1, wherein the camera includes an image element configured to detect a light in a range from a near-infrared light to a visible light,
   the antiglare plate further includes a reflective member on an area of the antiglare plate which is different from an emission area of the image light,
   the reflective member reflects, toward the camera, a natural light which has been reflected by a face surface of the driver, passed through an objection target member, and reached the antiglare plate, and
   the camera detects the natural light which has been reflected by the antiglare plate and captures the image thereof.

4. The head-up display according to claim 1, wherein the camera is installed in an orientation in which an optical axis of the camera is made incident toward a center of an eye point of the driver at an angle within an acceptable range where the optical axis of the camera is regarded as being horizontal with respect to a horizontal axis.

5. The head-up display according to claim 1, further comprising a light shielding member that opens and closes the optical path of the image light directed from the antiglare plate toward the projection target member, wherein
   the main controller is further connected to the light shielding member,
   the camera is installed outside the housing in an orientation for capturing an image of at least a part of an emission area of the image light on the antiglare plate, and
   the main controller is configured to control the light shielding member to close the optical path of the image light when a luminance value of the image captured by the camera is equal to or greater than a predetermined light shielding threshold value.

6. The head-up display according to claim 5, wherein the main controller is configured to control the light shielding member to open the optical path of the image light when, after controlling the light shielding member to close the optical path of the image light, the luminance value of an image newly captured by the camera is less than the light shielding threshold.

7. The head-up display according to claim 5, wherein the virtual image optical system includes:
   a concave mirror that reflects the image light toward the projection target member; and
   a mirror drive unit configured to change an orientation of a mirror surface of the concave mirror, and
   the main controller is configured to:
   output a control signal for rotating the concave mirror to the mirror drive unit based on a viewpoint position of the driver which has been detected by the viewpoint detection device, and
   output a control signal for rotating the mirror surface of the concave mirror for withdrawing the mirror surface from the optical path of the image light when the luminance value of the image captured by the camera is equal to or greater than the predetermined light shielding threshold value.

8. The head-up display according to claim 5, wherein the light shielding member is a shutter unit,
   the shutter unit includes a shutter and a movement mechanism including the shutter, which is configured to move the shutter to a withdrawn position and a light shielding position, and
   the withdrawn position is a position where the shutter is disposed out of the optical path of the image light, and the light shielding position is a position where the shutter is disposed on the optical path of the image light.

* * * * *